(12) United States Patent
Sullivan et al.

(10) Patent No.: US 10,948,283 B1
(45) Date of Patent: *Mar. 16, 2021

(54) TILEABLE STRUCTURED LIGHT PROJECTION SYSTEM

(71) Applicant: Facebook Technologies, LLC, Menlo Park, CA (US)

(72) Inventors: Mark Timothy Sullivan, Mountain View, CA (US); Andrew Matthew Bardagjy, Seattle, WA (US); Joseph Duggan, San Francisco, CA (US); Fei Liu, San Jose, CA (US); Simon Morris Shand Weiss, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,190

(22) Filed: Mar. 3, 2020

Related U.S. Application Data

(63) Continuation of application No. 15/799,898, filed on Oct. 31, 2017, now Pat. No. 10,612,912.

(51) Int. Cl.
| | |
|---|---|
| *G01B 11/22* | (2006.01) |
| *G06T 7/70* | (2017.01) |
| *H04N 5/225* | (2006.01) |
| *G02B 27/42* | (2006.01) |
| *G06T 7/13* | (2017.01) |
| *G06T 7/521* | (2017.01) |
| *G01B 11/02* | (2006.01) |

(52) U.S. Cl.
CPC ............ *G01B 11/22* (2013.01); *G01B 11/028* (2013.01); *G02B 27/425* (2013.01); *G06T 7/13* (2017.01); *G06T 7/521* (2017.01); *G06T 7/70* (2017.01); *H04N 5/2256* (2013.01); *G06T 2207/10016* (2013.01); *G06T 2207/10028* (2013.01)

(58) Field of Classification Search
CPC combination set(s) only.
See application file for complete search history.

(56) References Cited

U.S. PATENT DOCUMENTS

| | | |
|---|---|---|
| 4,846,577 A | 7/1989 | Grindon |
| 6,754,370 B1 | 6/2004 | Hall-Holt |
| 8,493,496 B2 | 7/2013 | Freedman et al. |
| 9,098,931 B2 | 8/2015 | Shpunt et al. |
| 2010/0315490 A1 | 12/2010 | Kim et al. |
| 2011/0025827 A1 | 2/2011 | Shpunt et al. |
| 2011/0080471 A1 | 4/2011 | Song et al. |

(Continued)

*Primary Examiner* — Fernando Alcon
(74) *Attorney, Agent, or Firm* — Fenwick & West LLP (57) ABSTRACT

A head-mounted display (HMD) system includes a projector system configured to emit a structured light (SL) pattern onto one or more objects in a local area, the projected SL pattern comprises at least a first SL pattern having a first field of view (FOV) corresponding to a first tileable boundary, and a second SL pattern having a second FOV corresponding to a second tileable boundary. Each of the projected SL patterns contains fiducials at predetermined locations within the SL pattern. An imaging device captures images of the local area including at least portions of the first SL pattern or the second SL patterns. The detected locations of the fiducials in the captured images is used to determine the boundary locations of the first and second SL patterns. Depth information of the local area is generated based upon the determined locations of the first and second SL patterns.

20 Claims, 8 Drawing Sheets

(56) References Cited

U.S. PATENT DOCUMENTS

| | | |
|---|---|---|
| 2011/0081072 A1 | 4/2011 | Kawasaki et al. |
| 2014/0307952 A1 | 10/2014 | Sweeney et al. |
| 2014/0362203 A1 | 12/2014 | Delaney et al. |
| 2015/0138346 A1 | 5/2015 | Venkataraman et al. |
| 2016/0025993 A1 | 1/2016 | Mor et al. |
| 2016/0238377 A1 | 8/2016 | Palmen |
| 2017/0142381 A1 | 5/2017 | Kaji |
| 2018/0061034 A1 | 3/2018 | Zhao et al. |
| 2018/0205937 A1 | 7/2018 | Zhu et al. |

TILEABLE STRUCTURED LIGHT PROJECTION SYSTEM

CROSS REFERENCE TO RELATED APPLICATIONS

This application is a continuation of co-pending U.S. application Ser. No. 15/799,898, filed Oct. 31, 2017, which is incorporated by reference in its entirety.

BACKGROUND

The present disclosure generally relates to systems that emit structured light patterns, and specifically relates to a projection system that generates a tileable structured light projection for wide field-of-view (FOV) depth sensing.

Structured light (SL) patterns may be used in generating depth maps for a local area. Conventional depth mapping systems typically use a single structured light pattern that is projected over some portion of a local area. However, generating a structured light pattern over a wide field of view can be difficult. For example, brightness, distortion, and/or resolution may be reduced as a field of view of a structured light pattern is increased.

SUMMARY

A projector system generates and projects a plurality of tillable structured light (SL) patterns into a local area. The projector system includes one or more illumination sources, a first diffractive optical element (DOE), a second DOE, and an optical assembly. The one or more illumination sources are configured to emit source light. The first DOE is configured to diffract a first portion of the source light to form a first SL pattern that has a first tileable boundary. The first structured light pattern includes a first set of fiducials. The second DOE is configured to diffract a second portion of the source light to form a second SL pattern that has a second tileable boundary. The second structured light pattern includes a second set of fiducials. The optical assembly is configured to project the first structured light pattern and the second structured light pattern into the local area such that a portion of the first tileable boundary is adjacent to a portion of the second tileable boundary.

In some embodiments, the projector system is a component of a head-mounted display (HMD) system. The HMD system comprises a projection assembly having one or more illumination sources that emit source light. The projection assembly further comprises a first diffractive optical element (DOE) configured to diffract a first portion of the source light to form a first structured light (SL) pattern having a first tileable boundary, the first structured light pattern including a first set of fiducials, and a second DOE configured to diffract a second portion of the source light to form a second SL pattern having a second tileable boundary, the second structured light pattern including a second set of fiducials. An optical assembly of the projection assembly is configured to project the first structured light pattern and the second structured light pattern into a local area based in part on locations of the first set of fiducials and the second set of fiducials, such that a portion of the first tileable boundary is adjacent to a portion of the second tileable boundary.

The HMD system further comprises an HMD having a detector assembly and a controller. The detector assembly is configured to capture an image of an object in the local area illuminated by the first and second SL patterns. The controller identifies a portion of the first set of fiducials in the image and a portion of the second set of fiducials in the image. The controller determines a location of the first tileable boundary based on the identified portion of the first set of fiducials. The controller determines a location of the second tileable boundary based on the identified portion of the second set of fiducials. The controller identifies at least a portion of the first SL pattern and the second SL pattern in the image, based in part on the determined location of the first tileable boundary and the determined location of the second tileable boundary. The controller determines a location of the object using at least one of the identified portion of the first SL pattern and the identified portion of the second SL pattern.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Structured light (SL) illumination (also referred to as SL pattern projection) with a wide field-of-view (FOV) is used to achieve wide FOV depth sensing of target objects. Disclosed embodiments include a method and apparatus for achieving an efficient wide FOV illumination by tileable multiple SL pattern projections. Each tiled SL pattern comprises one or more fiducial at designated locations within the pattern, allowing for the boundaries of each tiled SL pattern to be more easily identified. Each SL pattern projection may be associated with a high-performing rectangular FOV pattern projection (or, alternatively, hexagonal, square, etc.) obtained based on one or more diffractive optical elements. Each SL pattern projection may comprise a set of one or more fiducials projected at designated locations within the boundary of the SL pattern projection (e.g., at the corners of the boundary), allowing for the boundary of each SL pattern projection to be easily identified from one or more captured images.

Disclosed embodiments include a depth camera assembly (DCA) for determining depth information of one or more objects in a local area. The DCA includes one or more SL sources (e.g., a projector system), a detector (e.g., an imaging device), and a controller. Each SL source integrated into the DCA emits a SL pattern projection into the local area. The SL source includes an augmented diffractive optical element (ADOE) illuminated with one or more illumination sources of the SL source. An ADOE is a diffractive optical element that is designed to diffract light into a SL pattern projection that has a FOV corresponding to a tileable boundary (e.g., rectangular, hexagonal, square, etc.). The detector of the DCA captures one or more images of the local area illuminated with tiled light projections. The controller of the DCA determines depth information for objects in the local area using the one or more images.

The tiled SL pattern projections are configured to include fiducial sub-patterns at predetermined locations within each SL pattern projection. For example, where each SL pattern has a tileable boundary corresponding to a polygon, the fiducials may comprise a predetermined sub-pattern at one or more corners of the tileable boundary. The controller of the DCA is able to identify the fiducials projected onto the local area and captured by the detector, in order to identify the boundaries of one or more SL pattern projections. Depth information for the objections in the local area can be determined based upon the detected locations of the projected SL patterns.

In some embodiments, at least a portion of the DCA is integrated into a head-mounted display (HMD) that captures data describing depth information in a local area surrounding some or all of the HMD. The HMD may be part of an artificial reality system. The HMD may further include an electronic display and an optical assembly. The electronic display is configured to emit image light. The optical assembly is configured to direct the image light to an exit pupil of the HMD corresponding to a location of a user's eye, the image light comprising the depth information of the one or more objects in the local area determined by the DCA.

In some embodiments, the DCA is integrated into a station separate from a HMD. In one embodiment, the station is a console interfaced through a wired connection to a HMD. In an alternate embodiment, the station is a base station that wirelessly communicates with the HMD. The DCA of the station captures data describing depth information in an environment surrounding some or all of the station including a user wearing the HMD. The station may provide the depth information to the HMD, which is presented as content to the user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
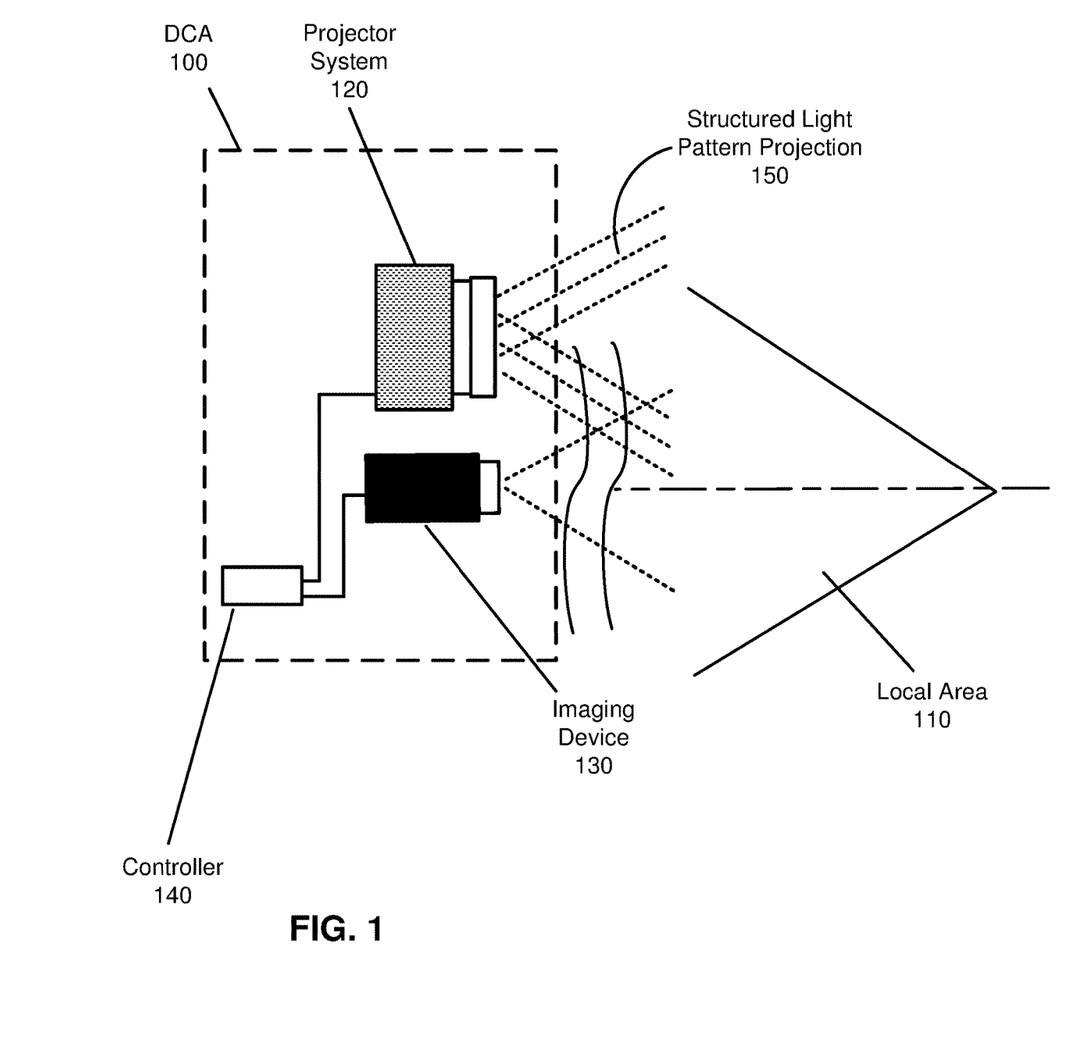
FIG. 1 illustrates a depth camera assembly (DCA), in accordance with some embodiments.

FIG. 1 illustrates a DCA 100, in accordance with some embodiments. The DCA 100 may be used for determining depth information of one or more objects in a local area 110110 surrounding some or all of the DCA 100. The DCA 100 includes a projector system 120, an imaging device 130, and a controller 140 that may be coupled to both the projector system 120 and the imaging device 130.

The projector system 120 comprises a source assembly having one or more illumination sources, each emitting a SL pattern projection into at least a portion of the local area 110. In some embodiments, the illumination sources of the projector system 120 emit coherent light at specific bands (e.g., a range of wavelengths of light). Example bands of light emitted by one or more light sources in the projector system 120 include a visible band (~380 nm to 750 nm), an infrared (IR) band (~750 nm to 1 mm), an ultraviolet band (10 nm to 380 nm), another portion of the electromagnetic spectrum, or some combination thereof. For example, an illumination source can be a laser producing light in the IR band. An illumination source of the projector system 120 may be composed of a plurality of laser-type light emitters on a single substrate configured to simultaneously emit a plurality of light beams in the form of a SL pattern projection. In other embodiments, an illumination source may comprise LEDs or other types of light emitting devices.

The source assembly of the projector system 120 emits the plurality of light beams through at least one projector assembly placed in front of the light emitters of the source assembly to form a corresponding SL pattern projection 150 projected over a portion of the local area 110. In some embodiments, the projector assembly comprises an ADOE configured to diffract the emitted light to form the SL pattern projection 150. An ADOE is a diffractive optical element that is modified to diffract light emitted from an associated illumination source of the source assembly into a SL pattern projection 150 that has a FOV corresponding to a tileable boundary of a suitable shape (e.g., rectangular, hexagonal, square, etc.). The ADOE is designed to prevent projection of portions of the SL pattern projection 150 that would otherwise lie outside the tileable boundary. In some embodiments, a pattern of the ADOE is designed with a pattern mask to prevent projection of portions of the SL pattern projection 150 that would lie outside a desired tileable boundary. In some embodiments, the projector assembly may further comprises one or more lenses or other optical elements to project the SL pattern generated by the ADOE over the FOV corresponding to the tileable boundary.

The SL pattern projection 150 with FOV corresponding to the tileable boundary can be combined with at least one other SL pattern projection 150 generated by the projector system 120 into a tiled light projection that illuminates the local area 110 with a wide FOV. The tiled light projection represents a SL pattern that illuminates one or more object in the local area 110 achieving a wide FOV while mitigating distortions. In some embodiments, the projector system 120 projects multiple SL patterns into the local area 110, each of the multiple SL patterns having a respective tileable boundary. Each projected SL pattern may share an edge of the tileable boundary with that of another projected SL pattern, minimizing a gap between the projected SL patterns. In addition, because each SL pattern is confined within its respective tileable boundary, an amount of overlap between SL patterns is minimized. As such, the SL patterns may cover a wide FOV of the local area. In other embodiments, each projected SL pattern may partially overlap with an adjacent SL pattern.

An SL pattern as used herein may refer to a pattern or configuration of light beams that may be projected onto one or more objects in the local area 110 surrounding the DCA 100. In some embodiments, a projected SL pattern comprises different light patterns that are associated with different locations in a virtual mapping of the local area 110, which corresponds to a real world environment onto which the projector system 120 projects the SL patterns. For example, the local area 110 may correspond to an interior of a room enclosing the projector system 120 that projects SL patterns onto one or more surfaces within the room (e.g., the walls and ceiling of the room, objects within the room, and/or the like). In some embodiments, the light patterns of the projected SL pattern may include dots, lines, sinusoidal shapes, and/or the like.

In some embodiments, each SL pattern has a unique location configuration, which describes a spatial configuration of light beams of the SL pattern and a reflectance type of the SL pattern. The spatial configuration of an SL pattern describes a number and an arrangement of illuminated regions within the SL pattern, while the reflectance type specifies a band of light (e.g., a range of wavelengths of light) used to generate the SL pattern. In some embodiments, the projector system 120 projects a plurality of SL patterns, of which no two SL patterns have the same unique location configuration. For example, each SL pattern may have a different spatial configuration, but have a common reflectance type. Alternatively, multiple SL patterns may have the same spatial configuration but have different reflectance types.

Each SL pattern comprises a set of one or more fiducials. As used herein, a "fiducial" may refer a predetermined pattern projected at a pre-determined location within an SL pattern. For example, a particular SL pattern having a tileable boundary of a particular shape (e.g., rectangular) may contain a fiducial at one or more corners of the tileable boundary. In some embodiments, the SL pattern may comprise a fiducial located in a different predetermined location within the SL pattern, such as at a center of the SL pattern. In some embodiments, a fiducial corresponds to a pattern of light (e.g., beams, dots, and/or other shapes) different from the pattern of the remainder of the SL pattern. In some embodiments, because a fiducial comprises a known predetermined pattern at a predetermined location with an SL pattern, the fiducial may be used by the projector system 120 to align the projection of the SL pattern.

The projector system 120 may emit light in accordance with emission instructions received from a controller (e.g., the controller 140). For example, the emission instructions may specify a time period or intensity of light emitted by the one or more illumination sources. In some embodiments, the emission instructions may control a configuration and/or orientation of the projector assembly comprising the one or more ADOEs and/or other optical elements.

The imaging device 130 captures one or more images of the one or more objects in the local area 110 illuminated by the tiled light projection, the one or more captured images including at least one SL pattern projected by the projector system 120. In various embodiments, the imaging device 130 may include one or more cameras, one or more video cameras, any other device capable of capturing images of the SL patterns projected by the projector system 120, or some combination thereof. For example, the imaging device 130 may include a red-green-blue (RGB) camera capable of capturing images in a visible band, an IR camera capable of capturing images in an IR band, or some combination thereof. In some embodiments, the imaging device 130 captures visible and IR image data concurrently, or may interleave capture of visible image data and image data. In some embodiments, captured visible image data may be used to determine color or texture information of objects in the local area, in addition to depth and/or position information.

Additionally, the imaging device 130 may include one or more filters (e.g., for increasing signal to noise ratio). For example, the one or more filters may comprise one or more bandpass filters based upon one or more wavelength ranges associated with one or more of the projected SL patterns. The imaging device 130 is configured to detect SL patterns in a field of view of the imaging device 130. In various embodiments, the images captured by the imaging device 130 comprise image data that is communicated from the imaging device 130 to the controller 140. The imaging device 130 receives one or more calibration parameters from the controller 140 to adjust one or more imaging parameters (e.g., focal length, focus, frame rate, ISO, sensor temperature, shutter speed, aperture, etc.) for capturing images of the local area 110. In alternate embodiments, the imaging device 735 is separate from the HMD 705.

The controller 140 is configured to provide emission instructions to the one or more illumination sources of the projector system 120 for controlling operations of the one or more illumination sources. In some embodiments, the emission instructions provided by controller 140 may indicate operating parameters corresponding to, e.g., wavelength, modulation, pulse rate, pulse duration, amplitude, ADOE selection, some other operation of the projector system 120, or some combination thereof. In addition, the controller 140 may be configured proving imaging instructions to control one or more operating parameters of the imaging device 130. For example, the imaging instructions may signal time periods in which the imaging device 130 captures images of the local area 110, imaging parameters of the imaging device 130, such as focus, frame rate, shutter speed, wavelength range, image capture resolution, and/or the like.

The controller 140 is further configured to receive the one or more images captured by the imaging device 130, and to determine depth information for the one or more objects in the local area 110 using the one or more images. In some embodiments, the controller 140 provides the determined depth information to a console (not shown in FIG. 1) and/or an appropriate module of an HMD (e.g., a varifocal module). The console and/or the HMD may utilize the depth information to, e.g., generate content for presentation on an electronic display (not shown).

While FIG. 1 illustrates the DCA 100 as a single unit, it is understood that in some embodiments, components of the DCA 100 may be in separate locations. For example, in some embodiments, the projector system 120 may be located on a console while the imaging device 130 may be part of an HMD located within the local area 110 of the console. In some embodiments, the controller 140 may be remote from the projector system 120 and/or the imaging device 130, and is configured to communicate with the projector system 120 and/or imaging device 130 via a network.

Figure 2:
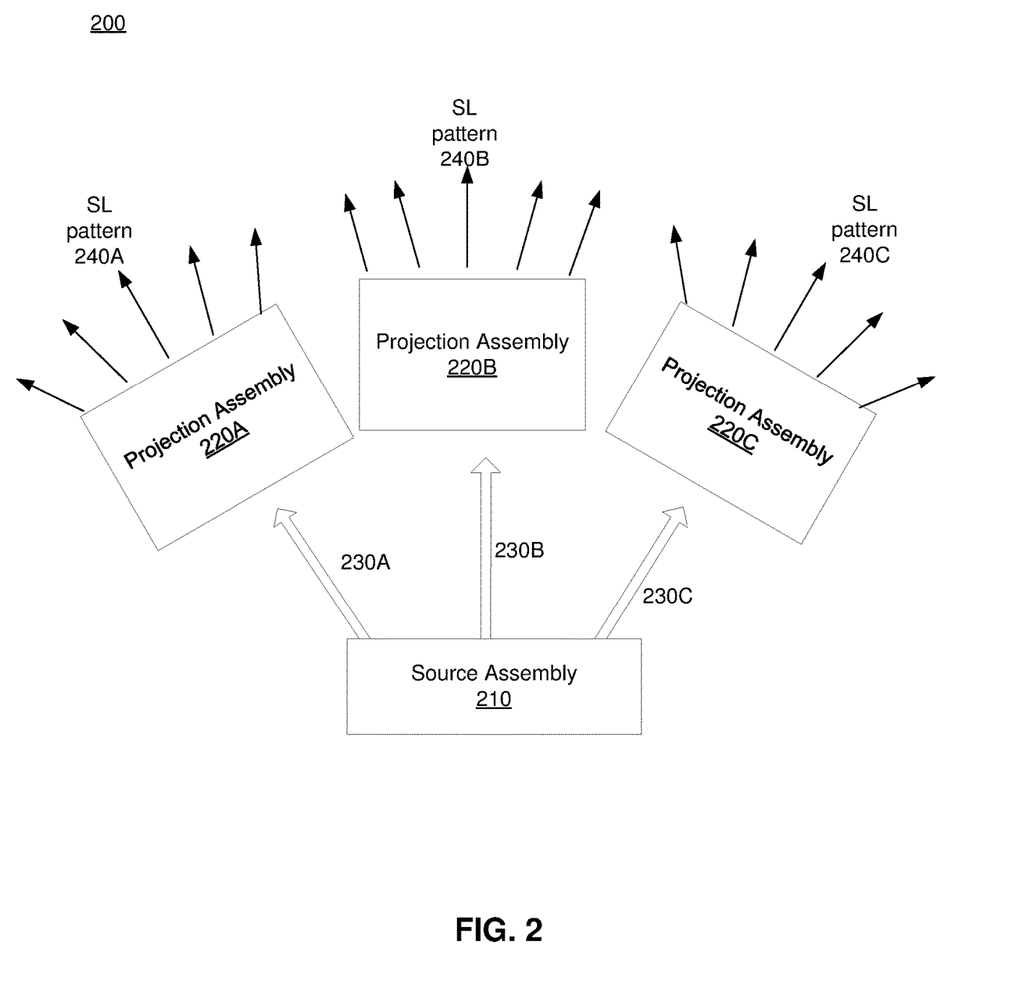
FIG. 2 is a block diagram of a projector system including multiple projection assemblies, in accordance with some embodiments.

FIG. 2 is a block diagram of an embodiment of a projector system 200 including multiple projection assemblies 220A, 220B, and 220C. The projector system 200 is an embodiment of the projector system 120. In the example shown by FIG. 2, the projector system 200 includes a source assembly 210 (e.g., corresponding to the one or more illumination sources of the projector system 120) and projection assemblies 220A, 220B, and 220C (corresponding to the at least one projector assembly of the projector system 120). The source assembly 210 comprises illumination sources configured to emit beams of light 230 (e.g., beams of light 230A, 230B, and 230C) directed to the projection assemblies 220A through 220C. Examples of illumination sources of the source assembly 210 include a laser diode, a vertical cavity surface emitting laser, a tunable laser, or another light source that emits light. In some embodiments, the illumination sources may comprise coherent light sources configured to emit coherent beams of light. In various embodiments, the source assembly 210 emits light in the IR band. In other embodiments, the source assembly 210 emits light in the visible band, in the ultraviolet (UV) band, or in any other suitable band. In some embodiments, the beams of light 230A through 230C may be relatively collimated. However, in some embodiments, the source assembly 210 emits beams of light 230A-C that are not collimated (e.g., diverging or converging). In some embodiments, the source assembly 210 also includes a collimator that collimates light from a light source into the beam of light 230A-C. In some embodiments, the different beams of light 230A, 230B, 230C output by the source assembly 210 are in the same ranges of wavelengths. Alternatively, different beams of light 230A, 230B, 230C output by the source assembly 210 are in different ranges of wavelengths. In addition, although FIG. 2 illustrate the beams of light 230A, 230B, and 230C as single beams of light, it is understood that in other embodiments, each beam of light 230A, 230B, 230C may comprise multiple beams of light.

The projection assemblies 220A, 220B, and 220C each receives a respective beam of light 230A, 230B, or 230C emitted from the source assembly 210 and outputs a respective SL pattern 240A, 240B, or 240C. In some embodiments, each of the projection assemblies 220A, 220B, and 220C includes a different ADOE, so each projection assembly 220A, 220B, and 220C outputs a different SL pattern 230A, 230B, and 230C, respectively. In alternate embodiments, the ADOEs in one or more of the projection assemblies 220A, 220B, and 220C may be the same (resulting in projected SL patterns having the same spatial configuration), but are each illuminated using a different range of wavelengths from the source assembly 210. For example, beam of light 230A is a particular range of wavelengths, beam of light 230B is a different range of wavelengths, and beam of light 230C is another range of wavelengths. Accordingly, the SL patterns 240A, 240B, and 240C may have the same spatial configuration, but different reflectance types. Thus, each of the SL patterns 240A, 240B, 240C can have a unique location configuration.

Using multiple projection assemblies 220A, 220B, and 220C allows for the projector system 200 to project SL patterns over a wider FOV, while avoiding the problems of using a single DOE to project a SL pattern over a wide FOV (e.g., large zero-order values relative to other diffraction orders, a large number of diffraction orders, etc.). For example, each of the SL patterns may have an FOV of approximately 60 degrees, allowing the projector system 200 to project SL patterns over a 180 degree view onto the local area. In addition, the use of multiple projection assemblies may allow for a greater density of light beams for each projected SL pattern, potentially allowing a more accurate mapping of the local area.

As discussed above, each of the projection assemblies 220A, 220B, and 220C comprises an ADOE configured to restrict the SL pattern projected by the respective projection assembly to within a tileable boundary. As such, projected SL patterns of adjacent projection assemblies 220A through 220C can be configured to tessellate with each other over the FOV of the projector system 200, with minimal overlap or gaps between adjacent SL patterns. In some embodiments, the ADOEs of each of the projection assembly 220A, 220B, and 220C may be associated with the same plane. In other embodiments, each of the ADOEs may be associated with different planes.

In some embodiments, the SL patterns 240A, 204B, and 240C projected by the projection assemblies 220A, 220B, and 220C each comprise a respective set of at least one fiducial at at least one predetermined location within the tileable boundary of the respective SL pattern 240A, 240B, or 240C. Because each fiducial corresponds to a predetermined pattern at a known location within a respective SL pattern 240A, 240B, or 240C, the location of the fiducial projected onto the local area can be used to determine the tileable boundary of the respective SL pattern 240A, 240B, or 240C. For example, a controller (e.g., the controller 140) may determine the locations of the tileable boundaries of one or more of the SL patterns 240A, 240B or 240C based upon a detected location of a fiducial captured within one or more images received from an imaging device (e.g., imaging device 130).

Although FIG. 2 illustrates each of the projection assemblies 220A, 220B, and 220C as separate components, in some embodiments, two or more ADOE structures of the projection assemblies 220A, 220B, and 220C are printed on the same substrate. Functionally, the ADOEs printed on the same substrate are equivalent to multiple physically separated ADOEs. However, physically, ADOEs printed on the same substrate representing a single part may simplify manufacturability. In addition, although FIG. 2 illustrates a single source assembly 210 projecting multiple beams of light 230A-C towards multiple projection assemblies 220A-C, it is understood that in other embodiments, the projector system 200 may comprise multiple source assemblies 210 (e.g., a different source assembly 210 for each of the projection assemblies 220A-C).

Figure 3:
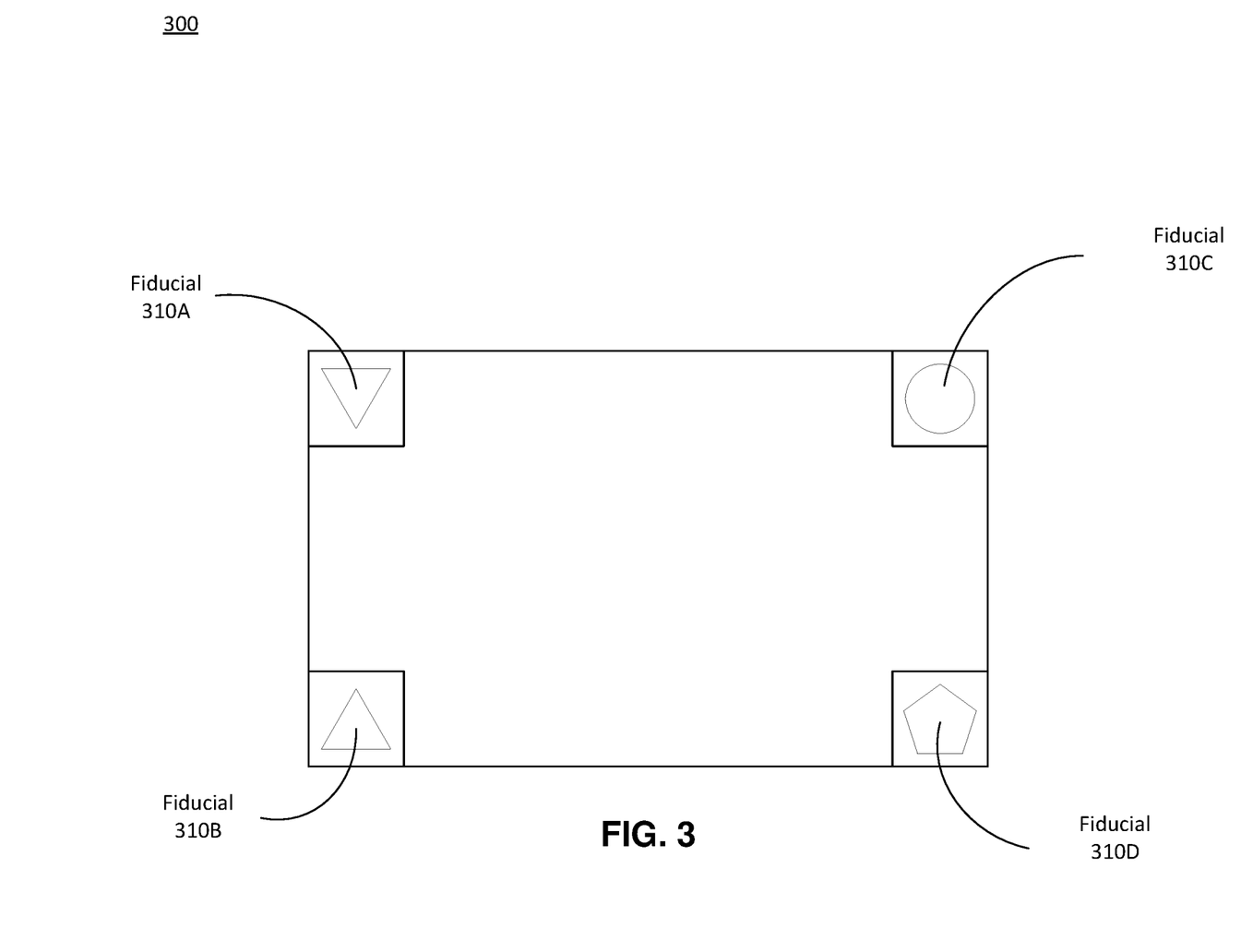
FIG. 3 illustrates an example projected SL pattern, in accordance with some embodiments.

FIG. 3 illustrates an example projected SL pattern 300, in accordance with some embodiments. The SL pattern 300 is projected by a projector system (e.g., the projector system 120 illustrated in FIG. 1) onto a local area (e.g., local area 110). As illustrated in FIG. 3, the SL pattern 300 is defined by a boundary having a predetermined shape (e.g., a rectangle). Although FIG. 3 only illustrates a single SL pattern 300, it is understood that a projector system may project multiple tileable SL patterns. For example, the SL pattern 300 may correspond to one of the SL patterns 240A, 240B, or 240C projected by the projector system 200 illustrated in FIG. 2.

The tileable SL pattern 300 is projected onto a local area, whereupon an imaging device (not shown) of a DCA (e.g., the DCA 100) captures one or more images from which at least a portion of the projected SL pattern 300 can be identified. Where multiple SL patterns are projected onto the local area, the DCA, in order to determine depth information, may identify the boundaries and relative positions of each projected SL pattern.

The SL pattern 300 may comprise a set of fiducials 310A-D located at designated locations within the SL pattern 300. In the illustrated embodiment, the set of fiducials includes a fiducial 310A, a fiducial 310B, a fiducial 310C, and a fiducial 310D. For example, the SL pattern 300 may correspond to a tileable boundary that is substantially rectangular in shape, and comprises a fiducial located at each corner of the rectangular boundary. Each fiducial may correspond to a light pattern that can be easily detected in images captured by the imaging device, allowing for the DCA to identify the corners of the projected SL pattern 310. By identifying the corners of the projected SL pattern 300, the position and orientation of the boundary of the projected SL pattern 300 can be identified.

In some embodiments, each corner of the SL pattern 300 may contain a different fiducial (e.g., fiducials 310A, 310B, 310C, 310D). As such, by identifying the locations of the fiducials, the DCA is able to determine which corners of the SL pattern 300 are projected on which locations, allowing for an orientation of the SL pattern 300 to be determined. For example, each of the fiducials 310A-310B may comprise a dot, pattern of dots, a shape such as a square, circle, or cross, and/or the like.

Although FIG. 3 illustrates the fiducials 310A-D as being located at the corners of the tileable boundary of the SL pattern 300, it is understood that in other embodiments, fiducials may be located at different locations within the tileable boundary. For example, in some embodiments, the SL pattern 300 may comprise a fiducial located at a center of the shape defined by the tileable boundary. The DCA may be able to determine the tileable boundary of the SL pattern 300 based upon a size and location of the fiducial. In other embodiments, the SL pattern 300 may comprise a plurality of fiducials spread across different locations on the tileable boundary, or at different locations within the shape defined by the tileable boundary.

In some embodiments, the projected SL pattern 300 comprises a unique pattern across the FOV of the pattern. In other embodiments, the projected SL pattern 300 comprises unique fiducials (e.g., fiducials 310A-D) at designated locations along the edges of the projected SL patterns 300 that can be used to identify the boundaries of the projected SL pattern 300. For example, in some embodiments, the projected SL pattern 300 comprises a repeated pattern or a non-unique pattern (e.g., a field of lines, a grid pattern, and/or the like). The fiducials 310A-D correspond to unique patterns projected at known locations of the projected SL pattern 300, facilitating identification of the boundaries of the projected SL pattern 300, and facilitating tiling of multiple projected SL patterns.

Figure 4:
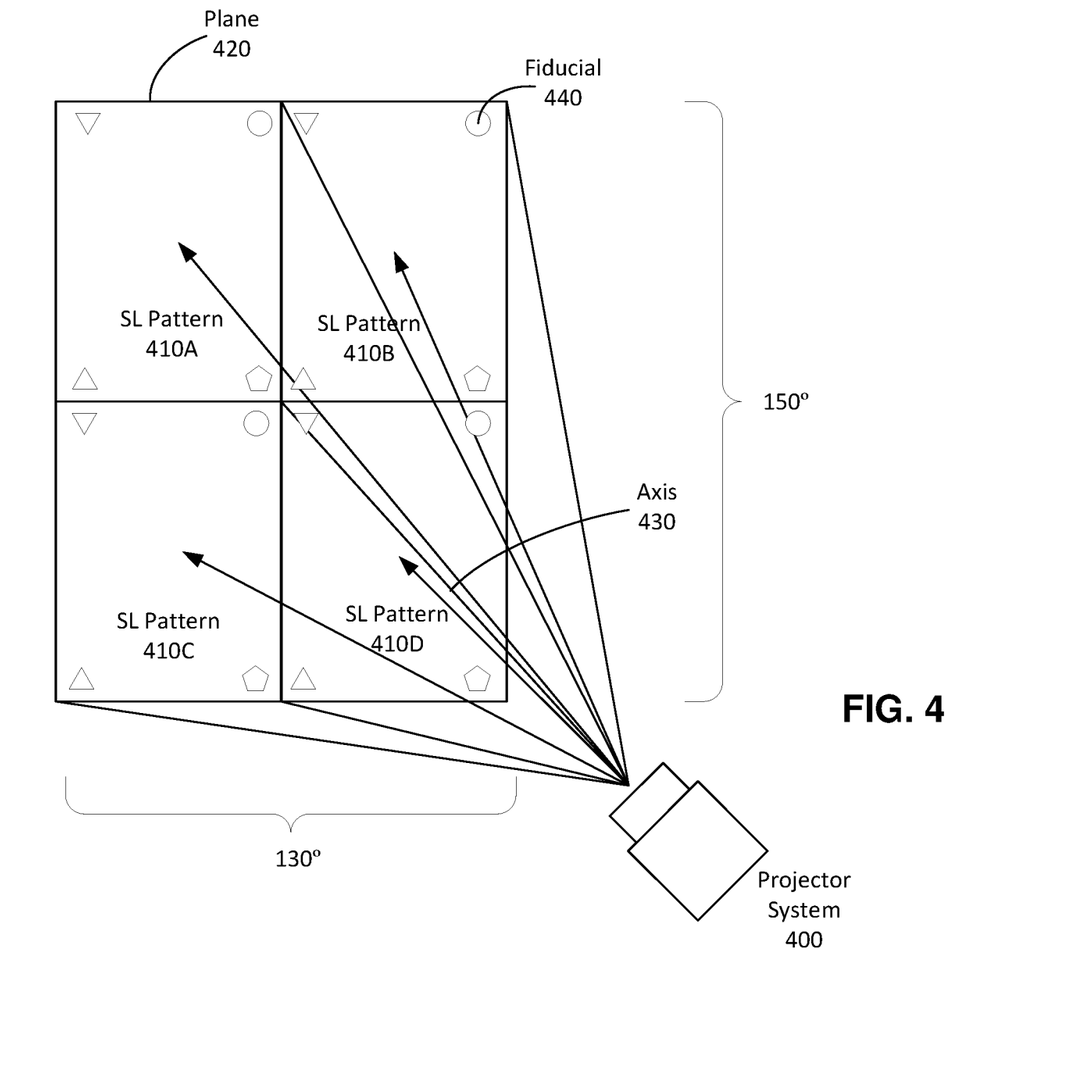
FIG. 4 illustrates projection of multiple tileable SL patterns containing fiducials, in accordance with some embodiments.

FIG. 4 illustrates projection of multiple tileable SL patterns containing fiducials, in accordance with some embodiments. A projector system 400, which may correspond to the projector system 120 illustrated in FIG. 1, projects multiple SL patterns 405A, 405B, 405C, and 405D onto a local area. Each of the SL patterns 410A-D are projected over a respective FOV corresponding to a tileable boundary having a particular shape (e.g., a rectangular shape). While FIG. 4 illustrates the SL patterns 410A-D all having substantially the same shape, in some embodiments, the projector system 400 may be able to project different SL patterns having different sizes or shapes (e.g., based upon the ADOEs within the projector system 400).

As illustrated in FIG. 4, the plurality of SL patterns 410A-D projected by the projector system 400 are configured to tessellate along a particular plane 410, such that the boundary of each projected SL pattern 410 A-D shares an edge with an adjacent SL pattern. In some embodiments, the plane 420 corresponds to a plane orthogonal to a central axis 430 of the projector system 400. In some embodiments, the plurality of SL patterns 410A-D collectively define a particular wide FOV (e.g., 130° by 150°, as illustrated in FIG. 4) over the plane 410.

In some embodiments, each of the projected SL patterns 410A-D includes a set of one or more fiducials 420 at predetermined locations with the SL pattern. For example, a fiducial 420 may be located at each corner of each of the rectangular SL patterns 410A-D. In some embodiments, a different fiducial 420 may be located at each corner of a projected SL pattern 410A-D, allowing for the DCA to determine the orientation of a projected SL pattern 410A-D based upon locations of detected fiducials 420. For example, each fiducial 440 within a particular projected SL pattern 410A-D may correspond to a different predetermined pattern. In other embodiments, at least two the fiducials 440 within a projected SL pattern 410 may correspond to the same predetermined pattern.

In some embodiments, each of the plurality of projected SL patterns 410A-D include the same fiducials 420. In other embodiments, the fiducials 420 associated with each projected SL pattern 410A-D may be unique. For example, the DCA may identify a specific projected SL pattern of the plurality of SL patterns 410A-D, based upon an identified fiducial 420.

In addition, although FIG. 4 illustrates the fiducials 440 located at the corners of the tileable boundary of each of the projected SL patterns 410A-D, it is understood that in other embodiments, the fiducials 440 may be projected at different locations with the SL patterns 410A-D (e.g., at a center of a respective SL pattern 410A-D, at a non-corner boundary of a respective SL pattern 410A-D, and/or the like).

In some embodiments, one or more of the fiducials 440 of each of the projected SL patterns 410A-D may function as an alignment fiducial. In some embodiments, the projector assembly of the projector system 400 may use the alignment fiducials 440 of one or more of the SL patterns 410A-D to tile the SL patterns 410A-D and minimize an amount of overlap between the SL patterns 410A-D.

In some embodiments, a plurality of tileable SL patterns may be oriented in a non-planar configuration. For example, the tileable SL patterns may projected such that they collectively define a curved or a non-planar surface. In some embodiments, each of the projected SL patterns may define a different plane.

Figure 5:
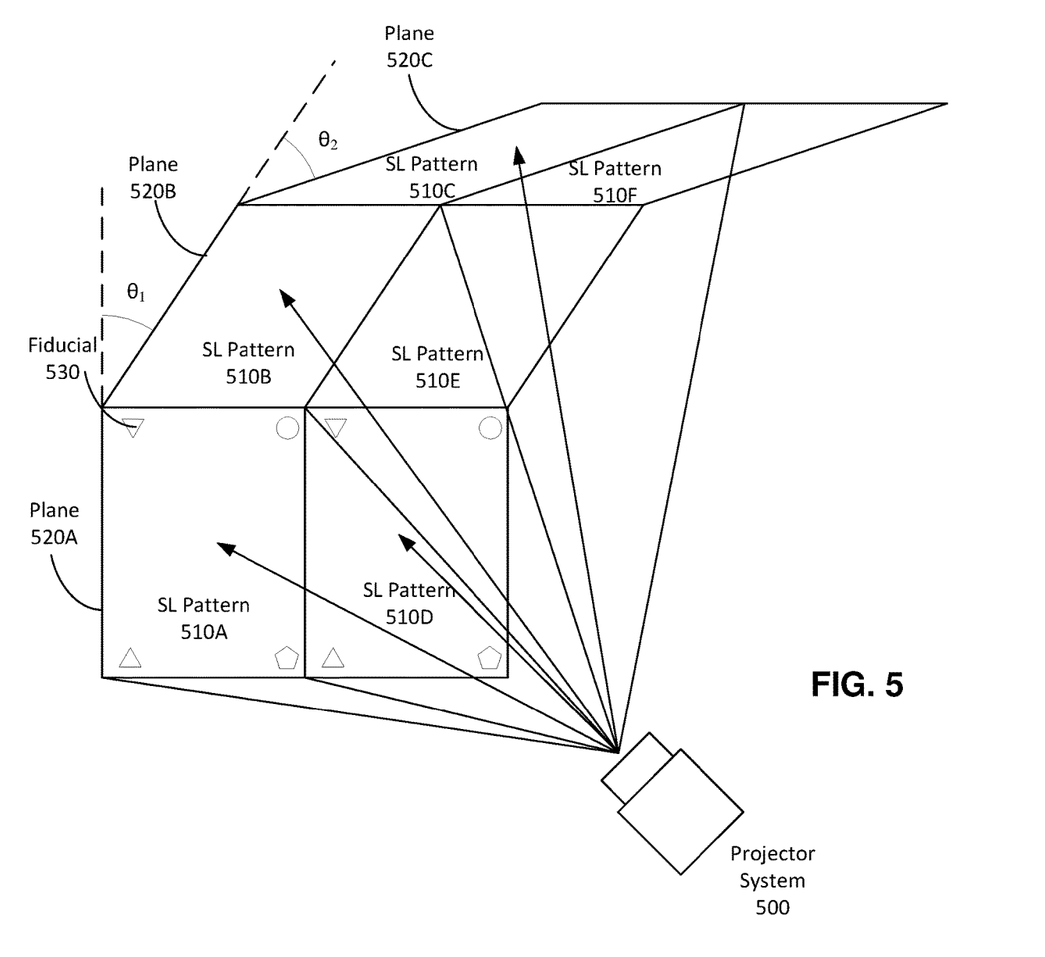
FIG. 5 illustrates a diagram of a projector system projecting tileable SL patterns containing fiducials, in accordance with some embodiments.

FIG. 5 illustrates a diagram of a projector system 500 projecting tileable SL patterns 510A-F containing fiducials, in accordance with some embodiments. The projector system 500 may correspond to the projector system 120 illustrated in FIG. 1. Each of the projected SL patterns 510A-F projected by the projector system 500 is defined by a boundary having a particular shape (e.g., a rectangular shape).

As illustrated in FIG. 5, the projector system 500 projects six different SL patterns 510A-F. The different projected SL patterns 510A-F are tiled such that they collectively define a curved or non-planar surface. For example, the SL patterns 510A-F may define three different planes 520 (a first plane 520A defined by SL patterns 510A and 510D, a second plane 520B defined by SL patterns 510B and 510E, and a third plane 520C defined by SL patterns 510C and 510F), each plane being offset by an angle (e.g., angles $\theta_1$ and $\theta_2$) relative to the previous plane. In addition, each of the SL patterns may define a substantially equal FOV.

In some embodiments, projecting different SL patterns such that they define a non-planar surface may allow for the projector system to better project SL patterns over objects in the local area surrounding the projector system. For example, the local area may corresponds to a room that the projector 500 is located in, wherein different objects in the local area (e.g., walls, ceilings, furniture) may be oriented differently relative to the projector system. By projecting SL patterns defined by different planes, the light beams of the SL pattern may be projected more uniformly over the objects of the local area compared to if the SL patterns are all defined by the same plane (e.g., as illustrated in FIG. 4), allowing for positions or depths of the objects in the local area to be more easily and accurately calculated.

Each of the projected SL patterns 510A-F contains a set of one or more fiducials 530. For example, as illustrated in FIG. 5, the projected SL patterns 510A and 510D each contain a fiducial 530 located at a corner of the SL pattern. In addition, the projected SL patterns 510B, 510C, 510E, and 510F may also contain fiducials (not shown). The fiducials 530 correspond to predetermined that may be easy for the DCA (e.g., DCA 100) to identify when captured in one or more images by an imaging device (e.g., the imaging device 130), allowing for the DCA to determine the boundaries of the corresponding SL pattern 510A-F. The DCA may use the determined locations of one or more of the SL patterns 510A-F to determine depth information for the local area. In some embodiments, the fiducials 530 may be projected on different locations of the SL patterns 510A-F (e.g., at a certain of the tileable boundary of a respective SL pattern 510A-F, on a border of the tileable boundary of the SL pattern 510A-F, at a non-border location of the tileable boundary of the SL pattern 510A-F, or any combination thereof).

In addition, while FIG. 5 illustrates each of the SL patterns 510A-F as having a rectangular tileable boundary, it is understood that in some embodiments, the projected SL patterns 510A-F may have tileable boundaries of different shapes. For example, in some embodiments, each of the projected SL patterns 510A-F may have a tileable boundary corresponding to shapes more easy to tessellate over a non-planar surface (e.g., pentagons).

Figure 6:
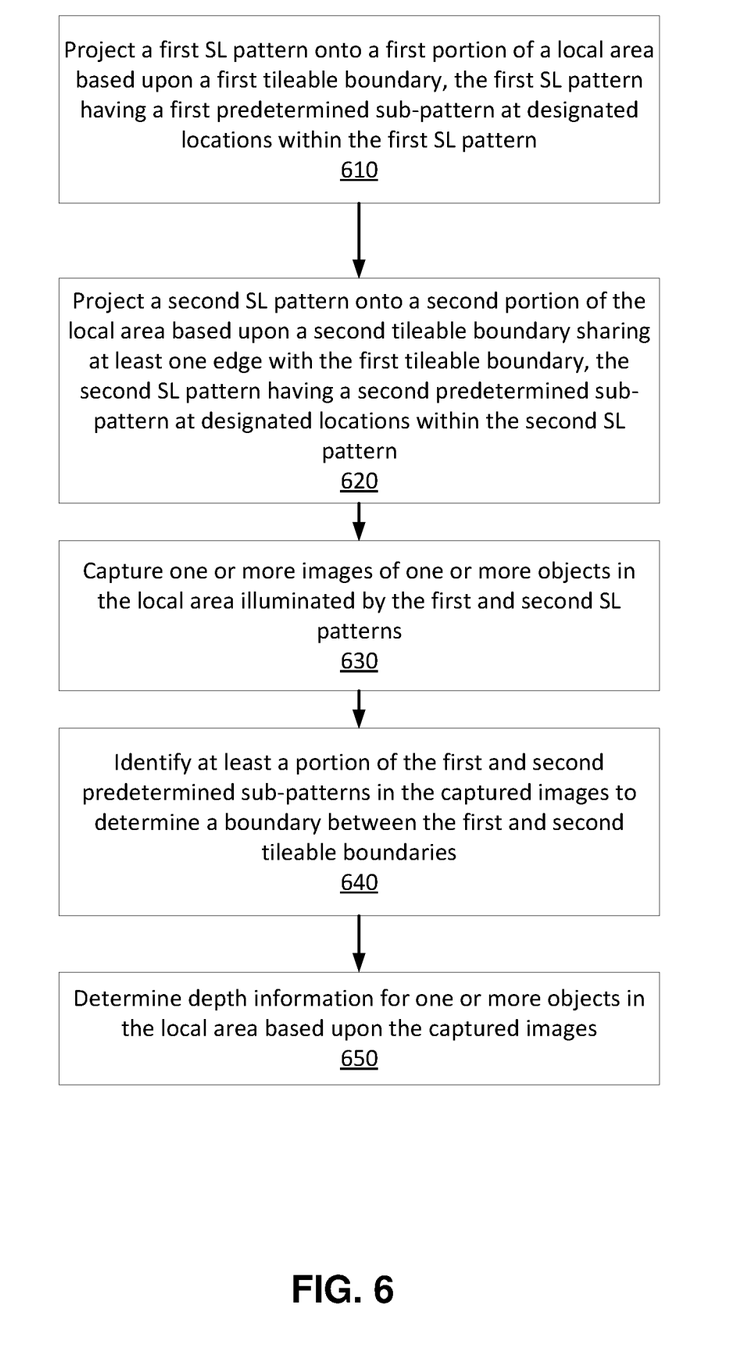
FIG. 6 illustrates a flowchart of a process for projecting SL patterns in accordance with some embodiments.
Figure 7:
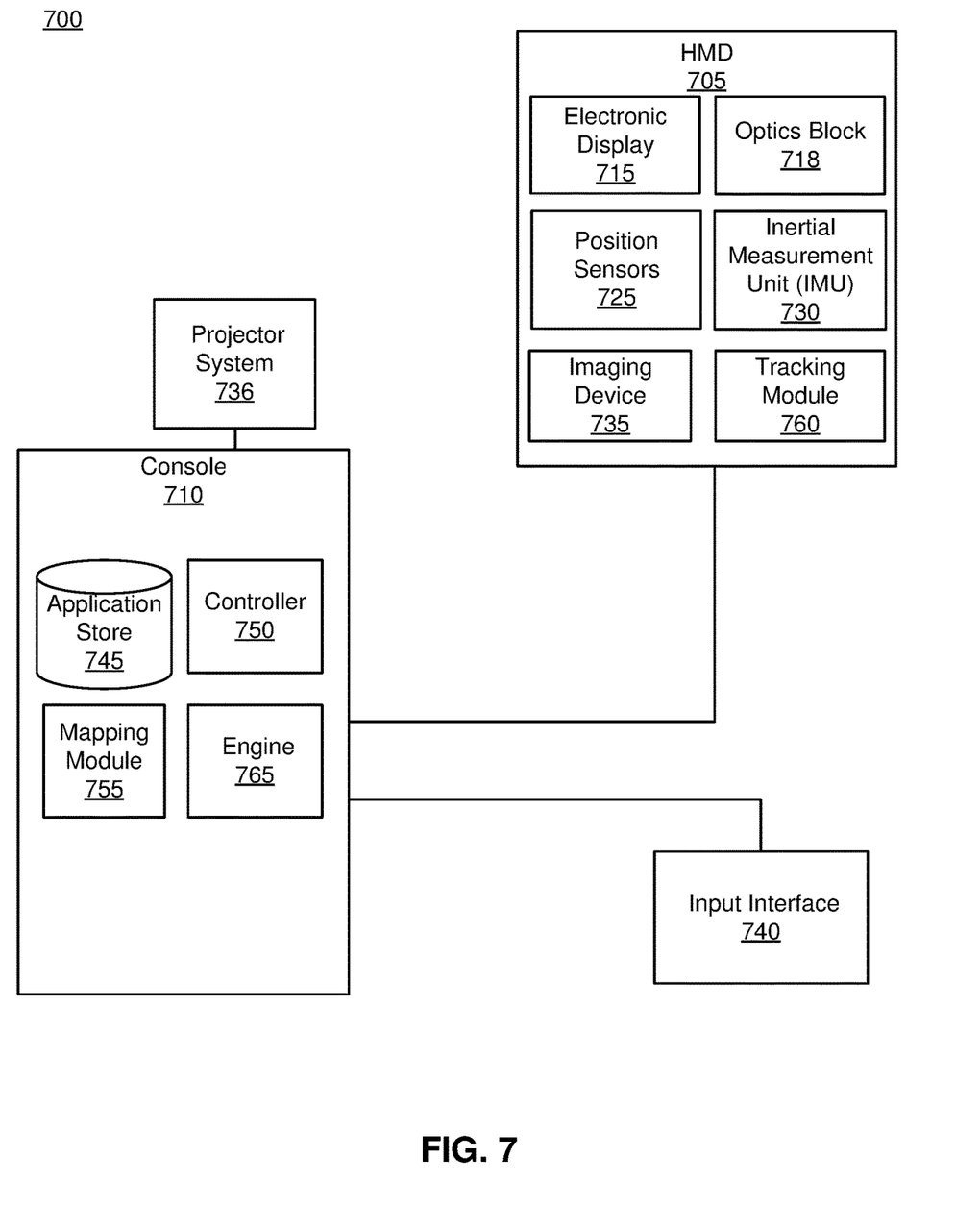
FIG. 7 is a head-mounted display system, in accordance with an embodiment.

FIG. 6 illustrates a flowchart of a process for projecting tileable SL patterns, in accordance with some embodiments. The process of FIG. 6 may be performed by a DCA (e.g., the DCA 100) as part of an HMD system (e.g., as illustrated in FIG. 7). Other entities may perform some or all of the steps of the process in other embodiments. Likewise, embodiments may include different and/or additional steps, or perform the steps in different orders.

The DCA projects 610 via a projector system (e.g., the projector system 120 illustrated in FIG. 1) a first SL pattern into a first portion of a local area. The first SL pattern is projected over a FOV corresponding to a first tileable boundary, and contains at least a first predetermined sub-pattern at one or more designated locations within the first SL pattern. For example, in some embodiments, the first tileable boundary may be substantially rectangular in shape, and the first predetermined sub-pattern may comprise a fiducial projected at each corner of the rectangular tileable boundary.

The DCA projects 620 via the projector system a second SL pattern onto a second portion of the local area. The second SL pattern is projected over a second FOV corresponding to a second tileable boundary, the second tileable boundary sharing at least one edge with the first tileable boundary. In some embodiments, the first and second tileable boundaries may collectively define a planar surface, while in other embodiments, the first and second tileable boundaries collective define a curved or a non-planar surface. In some embodiments, the second SL pattern is associated with the same wavelength range as the first SL pattern, while in other embodiments, the first and second SL patterns may be associated with different wavelength ranges.

The second SL pattern comprises a second predetermined sub-pattern at one or more designated locations. For example, the second predetermined sub-pattern may comprise fiducials projected at each corner of the second tileable boundary. In some embodiments, the second predetermined sub-pattern may be the same as the first predetermined sub-pattern. In other embodiments, the second predetermined sub-pattern and the first predetermined sub-pattern may be different.

The DCA captures 630 via an imaging device (e.g., the imaging device 130 illustrated in FIG. 1) one or more images of the local area illuminated by the first and second SL patterns. The imaging device is configured to capture images within the same wavelength range as the projected first and second SL patterns. In some embodiments, an image may capture a portion of both the first and second SL patterns (e.g., at an area around the shared edge of the first and second SL patterns). In embodiments where the first and second SL patterns are associated with different wavelength ranges, the imaging device may comprise an imaging device capable of capturing image data associated with the different wavelength ranges, or multiple imaging devices each associated with a different wavelength range.

In some embodiments, the imaging device is located on an HMD of the HMD system, while the projector system is located on a base station. In other embodiments, the imaging device and the projector system may be both located on the HMD or both on the base station.

The DCA identifies 640 using the one or more captured images at least a portion of the first predetermined sub-pattern and the second predetermined sub-pattern to determine a boundary between the first and second tileable boundaries. For example, because the first and second predetermined sub-patterns are projected at predetermined locations within each projected SL pattern, once a position of the first or second predetermined sub-pattern is known, the position and orientation of the corresponding SL pattern can be determined.

The DCA determines 650 depth information for one or more objects in the local area based upon the captured images. For example, the DCA may use the determined positions of the first and second SL patterns within the one or more captured images to determine a position of an HMD on which the imaging device is mounted relative to a base station containing the projector system. In some embodiments, the DCA uses the positions of the SL patterns within the captured images to determine a depth of the one or more objects relative to the HMD or to the base station. In some embodiments, the DCA may calculate depth information using one or more techniques in computing depth from the portion of the SL patterns within the captured images, such as stereo based techniques, structured light illumination techniques, time-of-flight technique, and/or a combination thereof. In various embodiments, the depth information determined by the DCA may be used to, e.g., update a model of the local area, and generate content based in part on the updated model System Overview FIG. 7 is a block diagram of an HMD system 700, in accordance with an embodiment. The HMD system 700 may operate in an artificial reality system. The HMD system 700 shown by FIG. 7 comprises a head-mounted display (HMD) 705 that includes a console 710, and an imaging device 735, a projector system 736, and an input interface 740 that are each coupled to the console 710. In some embodiments, the projector system 736 and the imaging device 735 may correspond to the projector system 120 and the imaging device 130 illustrated in FIG. 1, respectively.

While FIG. 7 shows an example system 700 including one HMD 705, one projector system 736, and one input interface 740, in other embodiments any number of these components may be included in the system 700. For example, there may be multiple projector systems 736 projecting a plurality of light patterns in a local area including the projector system 736, which the HMD 705 and/or the input interface 740 use to orient themselves within a virtual mapping of the local area. In the preceding example, each HMD 705, input interface 740, projector system 736, and imaging device 735 communicates with the console 710. In alternative configurations, different and/or additional components may be included in the system 700.

The HMD 705 may act as an artificial reality HMD. For example, the HMD may be an MR and/or AR HMD that augments views of a physical, real-world environment with computer-generated elements (e.g., images, video, sound, etc.). The HMD 705 presents content to a user. Example content includes images, video, audio, or some combination thereof. Audio content may be presented via a separate device (e.g., speakers and/or headphones) external to the HMD 705 that receives audio information from the HMD 705, the console 710, or both. The HMD 705 includes an electronic display 715, an optics block 718, one or more position sensors 725, an inertial measurement unit (IMU) 730, an imaging device 735, and a tracking module 760. The electronic display 715 displays images to the user in accordance with data received from the console 710. In various embodiments, the electronic display 715 may comprise a single electronic display or multiple electronic displays (e.g., a display for each eye of a user). Examples of the electronic display 715 include: a liquid crystal display (LCD), an organic light emitting diode (OLED) display, an active-matrix organic light-emitting diode display (AMO-LED), some other display, or some combination thereof.

The optics block 718 magnifies received image light, corrects optical errors associated with the image light, and presents the corrected image light to a user of the HMD 705. In various embodiments, the optics block 718 includes one or more optical elements. Example optical elements included in the optics block 718 include: an aperture, a Fresnel lens, a convex lens, a concave lens, a filter, or any other suitable optical element that affects image light. Moreover, the optics block 718 may include combinations of different optical elements. In some embodiments, one or more of the optical elements in the optics block 718 may have one or more coatings, such as anti-reflective coatings.

Magnification of the image light by the optics block 718 allows the electronic display 715 to be physically smaller, weigh less, and consume less power than larger displays. Additionally, magnification may increase a field of view of the content presented by the electronic display 715. For example, the field of view of the displayed content is such that the displayed content is presented using almost all (e.g., 110 degrees diagonal), and in some cases all, of the user's field of view. In some embodiments, the amount of magnification may be adjusted by adding or removing optical elements.

The optics block 718 may be designed to correct one or more types of optical error. Examples of optical error include two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 715 for display is pre-distorted, so the optics block 718 corrects the distortion when it receives image light from the electronic display 715 generated based on the content.

The IMU 730 is an electronic device that generates IMU data indicating an estimated position of the HMD 705 relative to an initial position of the HMD 705 based on measurement signals received from one or more of the position sensors 725. A position sensor 725 generates one or more measurement signals in response to motion of the HMD 705. Examples of position sensors 725 include: one or more accelerometers, one or more gyroscopes, one or more magnetometers, another suitable type of sensor that detects motion, a type of sensor used for error correction of the IMU 730, or some combination thereof. The position sensors 725 may be located external to the IMU 730, internal to the IMU 730, or some combination thereof.

Based on the one or more measurement signals generated by the one or more position sensors 725, the IMU 730 generates IMU data indicating an estimated position of the HMD 705 relative to an initial position of the HMD 705. For example, the position sensors 725 include multiple accelerometers to measure translational motion (forward/back, up/down, left/right) and multiple gyroscopes to measure rotational motion (e.g., pitch, yaw, roll). In some embodiments, the IMU 730 rapidly samples the measurement signals from various position sensors 725 and calculates the estimated position of the HMD 705 from the sampled data. For example, the IMU 730 integrates the measurement signals received from one or more accelerometers over time to estimate a velocity vector and integrates the velocity vector over time to determine an estimated position of a reference point on the HMD 705. Alternatively, the IMU 730 provides the sampled measurement signals to the console 710, which determines the IMU data. The reference point is a point that may be used to describe the position of the HMD 705. While the reference point may generally be defined as a point in space, in practice the reference point is defined as a point within the HMD 705 (e.g., a center of the IMU 730).

The IMU 730 receives one or more calibration parameters from the console 710. As further discussed below, the one or more calibration parameters are used to maintain tracking of the HMD 705. Based on a received calibration parameter, the IMU 730 may adjust one or more IMU parameters (e.g., sample rate). In some embodiments, certain calibration parameters cause the IMU 730 to update an initial position of the reference point so the initial position of the reference point corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The tracking module 760 may track movements of the HMD 705 using captured image data from one or more imaging devices 735. The tracking module 760 may also determine positions of the reference point of the HMD 705 using position information from the IMU data. Additionally, in some embodiments, the tracking module 760 may use portions of the IMU data, the image data, or some combination thereof, to predict a future location of the HMD 705. In some embodiments, the tracking module 760 provides the estimated or predicted future position of the HMD 705 to determine content to be displayed to the user through the electronic display 715 (e.g., using the engine 765 of the console 710).

In some embodiments, the tracking module 760 calibrates the system 700 using one or more calibration parameters and may adjust one or more calibration parameters to reduce error in determination of the position of the HMD 705. For example, the tracking module 760 may adjust the focus of the imaging device 735 to obtain a more accurate position for observed portion of projected SL patterns. Moreover, calibration performed by the tracking module 760 also accounts for information received from the IMU 730 in the HMD 705. Additionally, if tracking of the HMD 705 is lost (e.g., the imaging device 735 loses line of sight of some portion of the projected SL patterns), the tracking module 760 may re-calibrate some or all of the system 700. In some embodiments, the tracking module 760 may be implemented on the console 710 instead of the HMD 705.

The input interface 740 is a device that allows a user to send action requests to the console 710. An action request is a request to perform a particular action. For example, an action request may be to start an application, to end an application, or to perform a particular action within the application. The input interface 740 may include one or more input devices. Example input devices include: a keyboard, a mouse, a game controller, a joystick, a yoke, or any other suitable device for receiving action requests and communicating the received action requests to the console 710. An action request received by the input interface 740 is communicated to the console 710, which performs an action corresponding to the action request. In some embodiments, the input interface 740 may also include an imaging device 735 that captures images of one or more light patterns projected by the projector system 736 and provides the images to the console 710.

The input interface 740 may also include an IMU 730 that captures IMU data indicating an estimated position of the input interface 740 relative to an initial position of the VR interface 740 and provides the IMU data to the console 710. The IMU 730 receives one or more calibration parameters from the console 710. As further discussed below, the one or more calibration parameters are used to maintain tracking of the input interface 740.

The input interface 740 may provide haptic feedback to the user in accordance with instructions received from the console 710 in some embodiments. For example, haptic feedback is provided to the user when an action request is received. As another example, the input interface 740 provides haptic feedback to the user when the console 710 communicates instructions to the input interface 740 causing the input interface 740 to generate haptic feedback when the console 710 performs an action.

The console 710 provides content to the HMD 705 for presentation to the user in accordance with information received from one or more of: the imaging device 735, the HMD 705, and the input interface 740. In the example shown in FIG. 7, the console 710 includes an application store 745, a controller 750, a mapping module 755, and a virtual reality (VR) engine 765. Some embodiments of the console 710 have different components than those described in conjunction with FIG. 7. Similarly, the functions further described below may be distributed among components of the console 710 in different manners than described here in various embodiments.

The application store 745 stores one or more applications for execution by the console 710. An application is a group of instructions, that when executed by a processor, generates content for presentation to the user. Content generated by an application may be in response to inputs received from the user via movement of the HMD 705 or of the input interface 740. Examples of applications include: gaming applications, conferencing applications, video playback application, or other suitable applications.

The controller 750 controls the projector system 736 by generating and providing emission instructions to the projector system 736. In some embodiments, the controller generates emission instructions based upon types of light sources and DOEs available in the projector system 736, one or more user settings (e.g., received via the input interface 740), one or more parameters received from the HMD 705 (e.g., the controller 150 may adjust the emission instructions for the projector system 736 based upon captured image information from the imaging device 735 of the HMD 705), or any combination thereof. In some embodiments, the controller 750 may also generate instructions for the imaging device 735 on the HMD 705 for capturing images of the one or more objects in the local area illuminated by the projected SL patterns.

The mapping module 755 generates a virtual mapping of the local area based on the images of projected SL patterns received from the HMD 705 or from the input interface 740 (e.g., captured using the imaging device 735). For example, the mapping module 755 determines locations of portions of the SL patterns projected in the local area relative to the projector system 736 and to the HMD 705. For example, the mapping module 755 uses image data (e.g., images of portions of the local area) from the HMD 705 to calculate distances from portions of the projected SL patterns to the HMD 705. From the information received from the HMD 705 and the SL pattern information from the projector system 736, the mapping module 755 generates a virtual mapping by associating portions of the projected SL patterns to different locations in a virtual space that overlays the local area. For example, in some embodiments, the projected SL patterns can be used to augment detectable features in the local area, facilitating the construction of the virtual mapping by the mapping module 755 (e.g., in cases where the local area has few detectable features, such as a room with white walls, the projected SL patterns may add tracking patterns onto the local area detectable by the HMD 705 and usable by the mapping module 755 for virtual mapping). In some embodiments, the mapping module 755 and at least a portion of the controller 750 may be implemented as a single module (e.g., the DCA controller 140 illustrated in FIG. 1).

The engine 765 executes applications within the system 700 and receives position information, acceleration information, velocity information, predicted future positions, or some combination thereof, of the HMD 705 from the tracking module 760. Based on the received information, the engine 765 determines content to provide to the HMD 705 for presentation to the user. Content may include video information, one or more images, virtual objects, audio information, or some combination thereof. For example, if the received information indicates that the user has looked to the left, the engine 765 generates content for the HMD 705 that mirrors the user's movement in a virtual environment. Additionally, the engine 765 performs an action within an application executing on the console 710 in response to an action request received from the input interface 740 and provides feedback to the user that the action was performed. The provided feedback may be visual or audible feedback via the HMD 705 or haptic feedback via the input interface 740.

Figure 8:
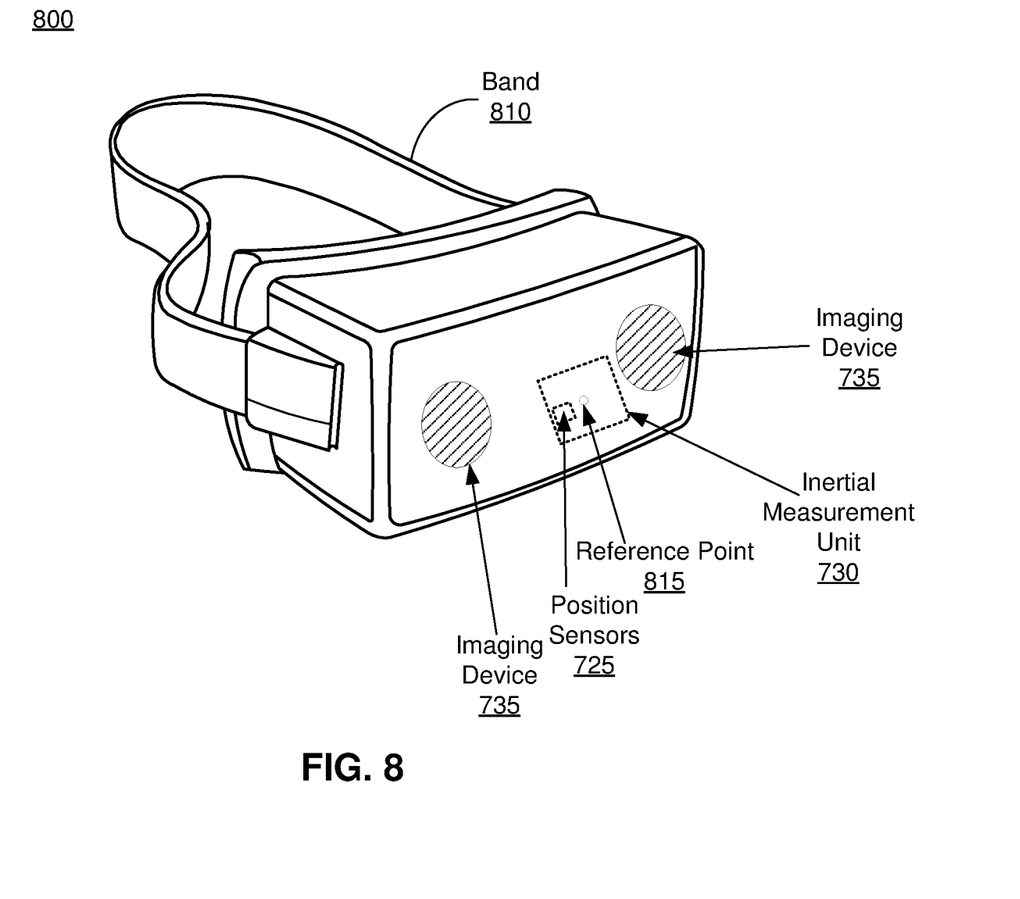
FIG. 8 is a wire diagram of a head-mounted display, in accordance with an embodiment.

FIG. 8 is a wire diagram of a HMD 800, in accordance with an embodiment. The HMD 800 is an embodiment of the HMD 705, and includes a front rigid body 805 and a band 810. The front rigid body 805 includes one or more electronic display elements of the electronic display 715 (not shown), the IMU 730, the one or more position sensors 725, and the imaging device 735. In some embodiments, the imaging device 735 comprises two different cameras, wherein separate images produced by the two cameras are used to determine distance from the HMD 800 to a portion of the SL patterns projected by projector system 736 imaged by both cameras. In some embodiments, the two cameras may be wide angle cameras with overlapping fields of view. In other embodiments, the imaging device 735 may comprise a single camera. For example, the imaging device 735 may comprise a single wide FOV camera able to capture images of SL patterns projected from multiple SL projectors having narrower FOVs. In some embodiments, the imaging device 735 comprises multiple cameras used in conjunction with the projector system 736 having multiple SL projectors to form a wider FOV depth system. In some embodiments, one or more projectors of the projector system 736 are used in conjunction with the imaging device 735 comprises a stereo camera pair having overlapping FOVs. Depth information can be determined based upon the stereo baseline between the cameras, as well as based upon a baseline between the cameras and projectors of the imaging device 735 and the projector system 736 respectively.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A projector system, comprising:
   an illumination source that emits source light;
   a projector assembly configured to diffract a first portion of the source light to form a first structured light (SL) pattern having a first tileable boundary, the first structured light pattern including a first set of fiducials, and to diffract a second portion of the source light to form a second SL pattern having a second tileable boundary, the second structured light pattern including a second set of fiducials;
   wherein the projector assembly is configured to project the first structured light pattern and the second structured light pattern into a local area such that the first tileable boundary and the second tileable boundary tessellate with each other, and wherein a controller identifies locations of the first tileable boundary and the second tileable boundary using the first set of fiducials and the second set of fiducials, respectively, and uses a remaining portion of the first SL pattern and the second SL pattern in the image, which is identified based upon the determined locations of the first tileable boundary and the second tileable boundary, to determine a depth of the object.

2. The projector system of claim 1, wherein the first and second SL patterns are projected such that a first central axis of a first plane corresponding to the first SL pattern is different from a second central axis of a second plane corresponding to the second SL pattern.

3. The projector system of claim 1, wherein a detector assembly is configured to capture an image of an object in the local area illuminated by the first and second SL patterns.

4. The projector system of claim 3, wherein the controller is further configured to:
   identify at least a portion of the first tileable boundary and the second tileable boundary using the captured image;
   adjust an alignment of the projected first SL pattern and the second SL pattern based upon the identified first and second tileable boundaries.

5. The projector system of claim 1, wherein the first tileable boundary and the second tileable boundary are substantially rectangular.

6. The projector system of claim 5, wherein the first set of fiducials includes at least one fiducial in each corner of the first tileable boundary.

7. The projector system of claim 1, wherein the first set of fiducials includes at least two fiducials that are different from each other.

8. The projector system of claim 1, wherein the first portion of the source light forming the first SL pattern comprises light of a first wavelength range, and the second portion of the source light forming second SL pattern comprises light of a second wavelength range different from the first wavelength range.

9. The projector system of claim 1, wherein the first tileable boundary has a first edge shared with the second tileable boundary when the first and second SL patterns are projected by the projector.

10. The projector system of claim 1, wherein the illumination source and projector assembly are integrated into a head-mounted display (HMD).

11. The projector system of claim 1, wherein a detector assembly configured to capture an image of an object in the local area illuminated by the first and second SL patterns is integrated into a head-mounted display (HMD), and the projector assembly is integrated into a station separate from the HMD.

12. The projector system of claim 1, wherein the projector assembly comprises a first diffractive optical element (DOE) configured to diffract the first portion of the source light, and a second DOE configured to diffract the second portion of the source light.

13. A projector system, comprising:
a projector assembly configured to project a tiled structured light (SL) pattern to illuminate one or more objects in a local area, the tiled SL pattern comprising:
a first SL pattern projected over a first field of view (FOV) having a first tileable boundary defining a first plane, and
a second SL pattern projected over a second FOV different from the first FOV and having a second tileable boundary different from the first tileable boundary defining a second plane non-parallel to the first plane;
wherein a controller is configured to:
receive one or more images of the one or more objects illuminated by the first and second SL patterns, the one or more images captured using a detector assembly comprising at least one camera;
determine a location of a device associated with the detector assembly using the one or more images.

14. The projector system of claim 13, wherein the first tileable boundary and the second tileable boundary tessellate with each other.

15. The projector system of claim 13, wherein:
the first SL pattern comprises a first set of fiducials;
the second SL pattern comprises a second set of fiducials; and
the controller is configured to identify locations of the first tileable boundary and the second tileable boundary using the first set of fiducials and the second set of fiducials, and use a remaining portion of the first SL pattern and the second SL pattern in the one or more images identified based upon the determined locations of the first tileable boundary and the second tileable boundary to determine the location of the device.

16. The projector system of claim 15, wherein the first set of fiducials includes at least two fiducials that are different from each other.

17. The projector system of claim 13, wherein the first tileable boundary and the second tileable boundary are substantially rectangular.

18. The projector system of claim 13, wherein the first tileable boundary has a first edge shared with the second tileable boundary when the first and second SL patterns are projected by the projector assembly.

19. The projector system of claim 13, wherein the second plane is offset relative to the first plane by a predefined angle.

20. The projector system of claim 13, wherein the projector assembly is integrated into a head-mounted display (HMD).

* * * * *